(12) United States Patent
Takeuchi et al.

(10) Patent No.: US 10,367,196 B2
(45) Date of Patent: Jul. 30, 2019

(54) LITHIUM-IRON-PHOSPHORUS-SULFUR-CARBON COMPOSITE AND METHOD FOR PRODUCING SAME

(71) Applicant: National Institute of Advanced Industrial Science and Technology, Tokyo (JP)

(72) Inventors: Tomonari Takeuchi, Osaka (JP); Hiroyuki Kageyama, Osaka (JP); Atsushi Sakuda, Osaka (JP); Hikari Sakaebe, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 81 days.

(21) Appl. No.: 15/527,185

(22) PCT Filed: Nov. 18, 2015

(86) PCT No.: PCT/JP2015/082416
§ 371 (c)(1),
(2) Date: Jun. 14, 2017

(87) PCT Pub. No.: WO2016/080443
PCT Pub. Date: May 26, 2016

(65) Prior Publication Data
US 2018/0006298 A1    Jan. 4, 2018

(30) Foreign Application Priority Data
Nov. 18, 2014    (JP) .................................. 2014-233711

(51) Int. Cl.
*H01M 4/36*    (2006.01)
*C01G 49/00*    (2006.01)
(Continued)

(52) U.S. Cl.
CPC ............. *H01M 4/364* (2013.01); *C01B 17/22* (2013.01); *C01G 49/00* (2013.01); *C01G 49/12* (2013.01);
(Continued)

(58) Field of Classification Search
None
See application file for complete search history.

(56) References Cited

U.S. PATENT DOCUMENTS

| 4,006,034 A * | 2/1977 | Shimotake ............ H01M 4/044 29/623.1 |
| 2005/0181277 A1 | 8/2005 | Koga et al. |
| 2010/0075226 A1* | 3/2010 | Pham .................... H01M 4/134 429/219 |

FOREIGN PATENT DOCUMENTS

| CN | 1180494 C | 12/2004 |
| CN | 1971981 A | 5/2007 |

(Continued)

OTHER PUBLICATIONS

Office Action issued to Chinese counterpart application No. 201580060741.1 by the SIPO dated Feb. 27, 2018.
(Continued)

*Primary Examiner* — Daniel S Gatewood
(74) *Attorney, Agent, or Firm* — Cesari and McKenna, LLP (57) ABSTRACT

A composite containing phosphorus, lithium, iron, sulfur, and carbon as constituent elements wherein lithium sulfide ($Li_2S$) is present in an amount of 90 mol % or more, and wherein the crystallite size calculated from the half-width of a diffraction peak based on the (111) plane of $Li_2S$ as determined by X-ray powder diffraction measurement is 80 nm or less. The composite exhibits a high capacity (in particular, a high discharge capacity) useful as an electrode active material for a lithium-ion secondary battery (in par-
(Continued)

ticular, a cathode active material for a lithium-ion secondary battery), without the need for stepwise pre-cycling treatment.

20 Claims, 8 Drawing Sheets (51) Int. Cl.
*C01B 17/22* (2006.01)
*H01M 4/58* (2010.01)
*H01M 10/052* (2010.01)
*H01M 10/0562* (2010.01)
*H01M 10/0565* (2010.01)
*C01G 49/12* (2006.01)
*H01M 4/134* (2010.01)
*H01M 4/136* (2010.01)
*H01M 4/38* (2006.01)
*H01M 4/583* (2010.01)
*H01M 10/0525* (2010.01)

(52) U.S. Cl.
CPC ........... *H01M 4/134* (2013.01); *H01M 4/136* (2013.01); *H01M 4/36* (2013.01); *H01M 4/38* (2013.01); *H01M 4/58* (2013.01); *H01M 4/583* (2013.01); *H01M 4/5815* (2013.01); *H01M 10/052* (2013.01); *H01M 10/0525* (2013.01); *H01M 10/0562* (2013.01); *H01M 10/0565* (2013.01); *Y02E 60/122* (2013.01); *Y02P 70/54* (2015.11); *Y02T 10/7011* (2013.01)

(56) References Cited

FOREIGN PATENT DOCUMENTS

| CN | 100555718 C | 10/2009 |
|---|---|---|
| EP | 1193786 A2 | 4/2002 |
| EP | 1187790 B1 | 10/2003 |
| JP | 2002/110163 A | 4/2002 |
| JP | 2002/284530 A | 10/2002 |
| JP | 2003/502265 A | 1/2003 |
| JP | 2005/259629 A | 9/2005 |
| WO | WO-2010/084808 A1 | 7/2010 |

OTHER PUBLICATIONS

Takeuchi et al "Preparation of Electrochemically Active Lithium Sulfide-Carbon Composites Using Spark-Plasma-Sintering Process" Journal of Power Sources vol. 195, pp. 2928-2934, 2010.

Takeuchi et al "Preparation of $Li_2S$—$FeS_2$ Composite Electrode Materials and Their Electrochemical Properties" Journal of the Japan Society of Powder and Powder Metallurgy vol. 60, pp. 13-18, 2013.

Takeuchi et al "Preparation of $Li_2S$—$FeS_x$—C Composite Positive Electrode Materials and Their Electrochemical Properties" The 54th Battery Symposium in Japan, p. 345, 2013.

Takeuchi et al: "Preparation of $Li_2S$—$FeS_x$ Composite Positive Electrode Materials and Their Electrochemical Properties with Pre-Cycling Treatments", Journal of the Electrochemical Society, vol. 162, No. 9, Oct. 9, 2014, pp. A1745-A1750.

Extended Search Report issued to European counterpart application No. 15860174.0 by the EPO dated Apr. 23, 2018.

* cited by examiner

LITHIUM-IRON-PHOSPHORUS-SULFUR-CARBON COMPOSITE AND METHOD FOR PRODUCING SAME

CROSS REFERENCE TO RELATED APPLICATIONS

This application is the National Stage of International Application No. PCT/JP2015/082416, filed on Nov. 18, 2015, which claims the benefit of Japanese Application No. 2014-233711, filed on Nov. 18, 2014. The contents of both applications are hereby incorporated by reference in their entirety.

TECHNICAL FIELD

The present invention relates to a lithium-iron-phosphorus-sulfur-carbon composite, and a method for producing the composite.

BACKGROUND ART

Recent years have seen technical advances in portable electronic devices and hybrid vehicles etc., and there has been a growing demand for secondary batteries with a higher capacity (in particular, lithium-ion secondary batteries with a higher capacity) for use in those devices and vehicles. The development of high-capacity cathodes for lithium-ion secondary batteries currently lags behind that of high-capacity anodes. Even actively researched and developed high-capacity $Li(Ni,Mn,Co)O_2$-based materials only have a capacity of about 250 to 300 mAh/g.

Sulfur, which has a theoretical capacity of as high as about 1,670 mAh/g, is one of the promising high-capacity electrode materials. However, elemental sulfur alone does not contain lithium, and lithium or a lithium-containing alloy is thus required for use in the anode, leaving few options for the anode.

Lithium sulfide, on the other hand, contains lithium, and thus allows alloys containing graphite or silicon, for example, to be used in anodes. Thus, lithium sulfide can provide a considerably wider selection of anodes, and this prevents risks such as short-circuit caused by dendrites generated by metal lithium. However, lithium sulfide, as lithium polysulfide, dissolves into an organic electrolyte during charge or discharge in a battery system that contains the organic electrolyte, and migrates into the anode to cause segregation (e.g., NPL 1), making it difficult to extract the inherent high capacity of lithium sulfide. To improve the performance of batteries that include lithium sulfide in a cathode, some measures are needed, such as, designing cathode layers capable of retaining the dissolved lithium polysulfide in the cathode; creating electrolytes capable of protecting the anode; and providing alternative solid electrolytes not involving lithium polysulfide flow.

One method for reducing the dissolution and flow of lithium polysulfide is to form bonds between sulfur atoms and other elements so that sulfur atoms cannot be released during Li extraction and insertion reaction. Doing this requires the preparation of a compound of lithium sulfide to which other elements are incorporated. "Other elements" suitable for incorporation are transition metal elements that can impart electrical conductivity to the insulating lithium sulfide, and examples include compounds such as $Li_xFe_yS_z$ disclosed in PTL 1. However, adding a large amount of other elements increases the chemical formula weight of the electrode active material, and also reduces the relative Li content, decreasing the theoretical capacity. In PTL 1, for example, an equimolar amount of $FeS_2$ is added to $Li_2S$ to form a composite, and the Fe content is thus 17% and the Li content is 33%, with the theoretical capacity estimated from the Li content being about 320 mAh/g, which is significantly lower than the theoretical capacity of lithium sulfide (about 1,170 mAh/g). Therefore, the amounts of other elements added must be minimized in the production of high-capacity electrode materials.

However, decreases in the amount of other elements increase free sulfur, which means an increase in the proportion of sulfur atoms that do not contribute to the charge and discharge reaction. The use of transition metals as other elements to be added not only further decreases the electrical conductivity, but also decreases the utilization rate of the electrode material. For example, as disclosed in NPL 2, a decrease in the Fe content of a $Li_2S$—$FeS_2$ composite from 16% to 3% increases the theoretical capacity from about 350 mAh/g to about 930 mAh/g, but the capacity obtained in the actual charge and discharge decreases from about 250 mAh/g to about 3 mAh/g. Because about 10% or less of the Fe content is considered to be sufficient to form Fe—S bonds and to impart electrical conductivity, the probable reason for the decrease in actual measured capacity is that the added Fe atoms are incorporated into the lithium sulfide crystal lattice, and fail to form Fe—S bonds. More specifically, lithium sulfide itself remains largely unchanged in the process of forming a composite, and the incorporated Fe atoms are present as a byproduct of $Li_2FeS_2$ without contributing to an increase in the utilization rate of the composite. This occurs because the composite is prepared only by heating treatment, and it is difficult to incorporate other elements into the lithium sulfide crystal lattice to form Fe—S bonds by heating treatment alone. Adding carbon can make the composite electrically conductive, but it is difficult to form C—S bonds to reduce free sulfur atoms only by heating treatment. Thus, transition metal elements must be added.

Examples of means to solve the problems include a method comprising incorporating Fe atoms into the lithium sulfide crystalline structure by a combination of heating treatment and mechanical milling. NPL 3, for example, discloses a method for preparing a $Li_xFe_yS_z$—C composite by heating $Li_2S$ and $FeS_2$ (or FeS), then mixing it with about 10% of carbon powder, and subjecting the mixture to mechanical milling for 8 hours using a grinder mill. NPL 3 reports that even when the Fe content is 2 to 10 atomic %, the composite exhibits a high capacity.

CITATION LIST

Patent Literature

PTL 1: WO2010/084808

Non-Patent Literature

NPL 1: T. Takeuchi, H. Sakaebe, H. Kageyama, H. Senoh, T. Sakai, and K. Tatsumi, J. Power Sources, 195, 2928 (2010).

NPL 2: Tomonari Takeuchi, Hiroyuki Kageyama, Koji Nakanishi, Toshiaki Ota, Atsushi Sakuda, Hikari Sakaebe, Hiroshi Senoh, Tetsuo Sakai, Kuniaki Tatsumi, Hironori Kobayashi, Zenpachi Ogumi, Powder and Powder Metallurgy, 60, 13 (2013)

NPL 3: Tomonari Takeuchi, Hiroyuki Kageyama, Koji Nakanishi, Chihiro Yogi, Masahiro Ogawa, Toshiaki Ota, Sakuta Atsushi, Hikari Sakaebe, Hironori Kobayashi, Kuniaki Tatsumi, Zenpachi Ogumi, The 54$^{th}$ Battery Symposium in Japan, 3E09 (2013).

SUMMARY OF INVENTION

Technical Problem

The present inventors filed a patent application for the method for producing a Li$_x$Fe$_y$S$_z$—C composite by heating Li$_2$S and FeS$_2$ (or FeS), then mixing it with about 10% of carbon powder, and subjecting the mixture to mechanical milling for 8 hours using a grinder mill (PCT/JP2014/073871).

The method disclosed in NPL 3 adds Fe to form Fe—S bonds to thereby reduce free sulfur atoms, thus increasing the utilization rate of the electrode material; however, when the Fe content is as low as 2 to 6 atomic % in its composition range of the material, some Fe—S bonds may have a long distance, and such bonds are weak. Because this causes typical charge and discharge to break the lithium sulfide structure along with extraction and insertion of Li, the material fails to exhibit a high capacity. For this reason, traditional methods require a pretreatment that repeats charge and discharge by increasing the capacity stepwise (stepwise pre-cycling treatment) when the Fe content is low in the composition range. Because this stepwise pre-cycling treatment takes about 5 days to 1 week, it is preferable to achieve a high capacity (in particular, a high discharge capacity) without such a pretreatment, from the standpoint of production process.

An option to achieve a high capacity without a pretreatment is to introduce not only transition metals but also elements that bind to a sulfur atom, in particular, main-group elements that form a stronger bond with a sulfur atom than transition metals (e.g., phosphorus, oxygen, and nitrogen).

To achieve a high capacity of a lithium sulfide-based electrode material without performing stepwise pre-cycling treatment, it is necessary to introduce multiple other elements (transition metal elements and main-group elements) into the lithium sulfide crystalline structure using a combination of multiple processes including heating treatment; form bonds between sulfur and transition metals, and between sulfur and main-group elements to reduce free sulfur atoms; and impart electrical conductivity to the material, as described above. However, there have been no reported cases in which a lithium sulfide composite incorporating multiple other elements was produced in accordance with the architectural design policy described here.

The present invention was made in view of the current status of the related art, and its main object is to provide a composite with a high capacity (in particular, a high discharge capacity) that is useful as an electrode active material for lithium-ion secondary batteries (in particular, a cathode active material for lithium-ion secondary batteries), without the need for stepwise pre-cycling treatment.

Solution to Problem

The present inventors conducted extensive research to achieve the object and found that a method comprising subjecting a mixture containing a lithium-containing compound, an iron-containing compound, a phosphorus-containing compound, a sulfur-containing compound, and a carbon-containing compound to electric current sintering and mechanical milling can provide a lithium-iron-phosphorus-sulfur-carbon composite wherein phosphorus atoms and iron atoms are incorporated in the lithium sulfide crystal lattice. The inventors also found that the composite obtained by this method exhibits enhanced electrical conductivity even inside the crystal because of the presence of iron atoms inside the crystal lattice of lithium sulfide; that the composite can serve as a high-capacity material because of the improved utilization rate of lithium sulfide; and that P—S and Fe—S bonds substantially decrease free sulfur atoms, thereby increasing the cycle characteristics. The inventors conducted further research on the basis of the findings, and completed the present invention. Specifically, the present invention encompasses the following subject matter.

Item 1.

A composite comprising, as constituent elements, lithium, iron, phosphorus, sulfur, and carbon, wherein lithium sulfide (Li$_2$S) is present in an amount of 90 mol % or more, and wherein the crystallite size calculated from a half-width of a diffraction peak based on the (111) plane of Li$_2$S as determined by X-ray powder diffraction measurement is 80 nm or less.

Item 2.

The composite according to Item 1 wherein
the Li content is 30 to 55 atomic %,
the Fe content is 2 to 7 atomic %,
the P content is 1 to 5 atomic %,
the S content is 25 to 40 atomic %, and
the C content is 8 to 25 atomic %.

Item 3.

A method for producing the composite according to Item 1 or 2, the method comprising subjecting a mixture containing a lithium-containing compound, an iron-containing compound, a phosphorus-containing compound, a sulfur-containing compound, and a carbon-containing compound to electric current sintering and mechanical milling.

Item 4.

The production method according to Item 3 wherein the electric current sintering and the mechanical milling are performed such that after the mixture containing a lithium-containing compound, an iron-containing compound, a phosphorus-containing compound, and a sulfur-containing compound is subjected to the electric current sintering, an obtained electric-current sintered product is subjected to the mechanical milling together with a carbon-containing compound.

Item 5.

The production method according to Item 4 wherein the mixture containing a lithium-containing compound, an iron-containing compound, a phosphorus-containing compound, and a sulfur-containing compound is a mixture of lithium sulfide and iron phosphorus trisulfide, and/or a mixture of lithium sulfide, iron sulfide, and phosphorus.

Item 6.

The production method according to any one of Items 3 to 5 wherein the electric current sintering and/or the mechanical milling is performed in a non-oxidizing atmosphere.

Item 7.

The production method according to any one of Items 3 to 6 wherein the electric current sintering and/or the mechanical milling is performed in an electrically conductive die.

Item 8.

The production method according to any one of Items 3 to 7 wherein the electric current sintering and/or the mechanical milling is performed under increased pressure.

Item 9.

An electrode active material for a lithium battery, the material comprising the composite according to Item 1 or 2, or the composite obtained by the production method according to any one of Items 3 to 8.

Item 10.

A lithium battery comprising, as a constituent element, the electrode active material for a lithium battery according to Item 9.

Item 11.

The lithium battery according to Item 10 that is a lithium-ion secondary battery.

Item 12.

An all-solid-state lithium-ion secondary battery comprising, as constituent elements, the electrode active material for a lithium battery according to Item 9 and a lithium-ion conductive solid electrolyte.

Item 13.

The all-solid-state lithium-ion secondary battery according to Item 12 wherein the lithium-ion conductive solid electrolyte is at least one member selected from the group consisting of polymer-based solid electrolytes, sulfide-based solid electrolytes, and oxide-based solid electrolytes.

Advantageous Effects of Invention

The composite according to the present invention (the lithium-iron-phosphorus-sulfur-carbon composite) refers to a submicron particle with a crystallite size of 80 nm or less, in particular 50 nm or less, and the composite has a stabilized metastable phase in which iron atoms and phosphorus atoms are incorporated inside the lithium sulfide crystal lattice, with carbon uniformly dispersed. In this composite according to the present invention, phosphorus atoms and iron atoms incorporated into the lithium sulfide crystal lattice bind to sulfur atoms to thereby enhance the electrical conductivity even inside the lattice. Therefore, the composite achieves a high electrode utilization rate (in particular, a cathode utilization rate) and sufficiently exhibits high-capacity characteristics inherent to lithium sulfide. In addition, the bonds between sulfur and phosphorus or iron in the composite of the present invention suppress the dissolution and flow of polysulfide occurring during the Li extraction and insertion reaction, contributing to excellent cycle characteristics. Moreover, the presence of iron and carbon enhances the electrical conductivity. Thus, the composite can serve as a high-capacity cathode active material.

As described above, the composite according to the present invention (the lithium-iron-phosphorus-sulfur-carbon composite) is a highly useful substance as an electrode active material (in particular, a cathode active material) for lithium-ion secondary batteries, such as non-aqueous electrolyte lithium-ion secondary batteries and all-solid-state lithium-ion secondary batteries.

The production method according to the present invention can produce the composite according to the present invention (the lithium-iron-phosphorus-sulfur-carbon composite), which has such excellent properties, in a relatively simple manner.

DESCRIPTION OF EMBODIMENTS

1. Lithium-Iron-Phosphorus-Sulfur-Carbon Composite

In the composite according to the present invention (the lithium-iron-phosphorus-sulfur-carbon composite), phosphorus atoms and iron atoms (elements added) are present in the lithium sulfide crystal lattice, forming P—S and Fe—S bonds; thus, free sulfur is absent. Thus, lithium polysulfide does not dissolve into the electrolyte during the extraction or insertion of Li, and does not migrate into or precipitate in the anode. In addition, the composite has electrical conductivity due to the content of Fe and C, and exhibits excellent charge-discharge characteristics.

The composite of the present invention (the lithium-iron-phosphorus-sulfur-carbon composite) contains lithium sulfide as the main phase, according to an X-ray powder diffraction measurement. The amount of the lithium sulfide phase present in the entire composite is 90 mol % or more, and preferably 95 mol % or more. The composite of the present invention (the lithium-iron-phosphorus-sulfur-carbon composite) may contain, in addition to the lithium sulfide crystal phase, impurities in a trace amount of up to about 10 mol % (in particular, up to about 5 mol %); such a small amount of impurities has limited influence on the charge and discharge characteristics.

The composite of the present invention (the lithium-iron-phosphorus-sulfur-carbon composite) consists of one or more crystallites with a submicron or smaller size, because the lithium-iron-phosphorus-sulfur-carbon composite, which is a metastable phase, is present in a stable manner. More specifically, the composite of the present invention (the lithium-iron-phosphorus-sulfur-carbon composite) has a crystallite size of 80 nm or less, and preferably 60 nm or less (in particular, 1 to 50 nm). As in the production method of the present invention described later, when the composite of the present invention (the lithium-iron-phosphorus-sulfur-carbon composite) is produced by a production method including mechanical milling, submicron crystallites can be produced by the mechanical milling. The crystallite size of the composite of the present invention is calculated from the half-width of a diffraction peak based on the (111) plane of lithium sulfide observed as the main phase (the highest peak intensity) in X-ray powder diffraction measurement using the Scherrer equation.

The proportion of each element present in the composite of the present invention (the lithium-iron-phosphorus-sulfur-carbon composite) is not particularly limited. It is preferable that Fe and P are present in such an amount as to form P—S bonds and Fe—S bonds; that Li is present in such an amount that the theoretical capacity estimated from the Li content is about 600 mAh/g or more; and that Fe and C are present in such an amount as to achieve electrical conductivity, to the degree that free sulfur does not occur. From this viewpoint, the Li content is preferably 30 to 55 atomic % (in particular, 35 to 50 atomic %, more preferably 39 to 47 atomic %), the Fe content is preferably 2 to 7 atomic % (in particular, 2 to 6 atomic %, more preferably 2.5 to 5.5 atomic %), the P content is preferably 1 to 5 atomic % (in particular, 2 to 5 atom %, more preferably 2.5 to 4.5 atomic %), the S content is preferably 25 to 40 atomic % (in particular, 30 to 35 atomic %, more preferably 32 to 35 atomic %), and the C content is preferably 8 to 25 atomic % (in particular, 10 to 20 atomic %, more preferably 14 to 17 atomic %) in the formed composite of the present invention (the lithium-iron-phosphorus-sulfur-carbon composite).

The reason why the Li content is such an amount as to give a theoretical capacity of about 600 mAh/g or more is that because an oxide-based high-capacity material Li(Ni,Mn,Co)$O_2$ has an energy density of 300 mAh/g×4V=1200 Wh/kg as the highest value, an equivalent sulfur-based material (voltage 2V) having a capacity of 600 mAh/g or more is considered to be sufficient.

In the composite of the present invention (the lithium-iron-phosphorus-sulfur-carbon composite) described above, phosphorus atoms and iron atoms are arranged in the lithium sulfide crystal lattice to form P—S bonds and Fe—S bonds. This forms phosphorus- and iron-containing lithium sulfide, which is a metastable phase, and the composite becomes a submicron particle. The phosphorus- and iron-containing lithium sulfide, which is inherently a metastable phase, is therefore stabilized.

In the composite of the present invention (the lithium-iron-phosphorus-sulfur-carbon composite) characterized as above, phosphorus atoms and iron atoms (elements added) are arranged in the lithium sulfide crystal lattice, and form P—S and Fe—S bonds. Thus, the composite contains almost no free sulfur atoms, and lithium polysulfide does not dissolve into the electrolyte during the extraction or insertion of Li, and does not migrate into or precipitate in the anode, contributing to excellent cycle characteristics. In addition, the Fe and C contents impart excellent electrical conductivity to the composite; in particular, the Fe—S bonds formed by Fe inside the lithium sulfide crystal lattice enhance the utilization of the inner part of the lithium sulfide crystal, making the composite a high-capacity material.

2. Method for Producing Lithium-Iron-Phosphorous-Sulfur-Carbon Composite

The composite of the present invention (the lithium-iron-phosphorus-sulfur-carbon composite) can be obtained by subjecting a mixture containing a lithium-containing compound, an iron-containing compound, a phosphorus-containing compound, a sulfur-containing compound, and a carbon-containing compound to electric current sintering and mechanical milling, without any particular restriction. This method forms a submicron particle such that phosphorus atoms and iron atoms are incorporated into the lithium sulfide phase, thereby giving a composite in which the metastable phase is stabilized, while carbon is uniformly dispersed. The following describes this method in more detail.

(1) Starting Material Powder

The present invention uses a lithium-containing compound, an iron-containing compound, a phosphorus-containing compound, a sulfur-containing compound, and a carbon-containing compound as starting materials.

The type of each compound, i.e., the lithium-containing compound, iron-containing compound, phosphorus-containing compound, sulfur-containing compound, and carbon-containing compound, is not particularly limited. Five compounds that individually contain one of lithium, iron, phosphorus, sulfur, and carbon, or six or more compounds can be mixed for use; or a compound containing two or more elements of lithium, iron, phosphorus, sulfur, and carbon can be used as part of or the entirety of the starting materials.

These starting material compounds preferably contain no metal element other than lithium, iron, and phosphorus. Elements other than lithium, iron, phosphorus, sulfur, and carbon contained in the starting material compounds are preferably released and volatilized by a heating treatment described later (preferably by a heating treatment in a non-oxidizing atmosphere).

Specific examples of such starting material compounds are as follows. Specific examples of lithium-containing compounds include lithium sulfide ($Li_2S$), lithium carbonate ($Li_2CO_3$), lithium hydroxide (LiOH), and lithium phosphate ($Li_3PO_4$). Specific examples of iron-containing compounds include metal iron (Fe), iron sulfide (FeS, $FeS_2$, etc.), iron sulfate ($FeSO_4$), and iron phosphorus trisulfide ($FePS_3$). Specific examples of phosphorus-containing compounds include phosphorus (P), iron phosphorus trisulfide ($FePS_3$), and lithium phosphate ($Li_3PO_4$). Specific examples of sulfur-containing compounds include sulfur (S), lithium sulfide ($Li_2S$), benzothiophene ($C_8H_6S$), iron sulfide (FeS, $FeS_2$), and iron phosphorus trisulfide ($FePS_3$). Specific examples of carbon-containing compounds include carbon (C), lithium carbonate ($Li_2CO_3$), and benzothiophene ($C_8H_6S$). Of these, preferable is a combination of lithium sulfide ($Li_2S$), iron phosphorus trisulfide ($FePS_3$), and carbon (C); and a combination of lithium sulfide ($Li_2S$), iron sulfide (FeS, $FeS_2$, etc.), phosphorus (P), and carbon (C), because the combinations consist of only the constituent elements of the composite of the present invention (the lithium-iron-phosphorus-sulfur-carbon composite), which is the target product, and causes a reaction with a few starting materials. Examples of usable carbon (C), which is also a starting material, include graphite, mesoporous carbon, and hard carbon (non-graphitizable carbon material).

The shape of these starting material compounds is not particularly limited, and is preferably in the form of powder having a mean particle size of about 0.1 to 100 μm. The mean particle size of the starting material compounds is determined as the value at which the cumulative frequency reaches 50% in particle size distribution measured by a dry laser diffraction/scattering method. Starting material compounds having a large particle size may be used, and the mean particle size can be adjusted by pulverizing the materials using a mortar etc.

The proportion of each starting material, a lithium-containing compound, an iron-containing compound, a phosphorus-containing compound, a sulfur-containing compound, and a carbon-containing compound in the mixture is not particularly limited. In the ultimately obtained product, i.e., the composite of the present invention (the lithium-iron-phosphorus-sulfur-carbon composite), it is preferable that Fe and P are present in such an amount as to form P—S bonds and Fe—S bonds without generating free sulfur atoms; that Li is present in such an amount that the theoretical capacity estimated from the Li content is about 600 mAh/g or more; and that Fe and C are present in such an amount as to achieve electrical conductivity. From these viewpoints, it is preferable in the formed composite of the present invention (the lithium-iron-phosphorus-sulfur-carbon composite) that the Li content is 30 to 55 atomic % (in particular, 35 to 50 atomic %, more preferably 39 to 47 atomic %), that the Fe content is 2 to 7 atomic % (in particular, 2 to 6 atomic %, more preferably 2.5 to 5.5 atomic %), that the P content is 1 to 5 atomic % (in particular, 2 to 5 atomic %, more preferably 2.5 to 4.5 atomic %), that the S content is 25 to 40 atomic % (in particular, 30 to 35 atomic %, more preferably 32 to 35 atomic %), and that the C content is 8 to 25 atomic % (in particular, 10 to 20 atomic %, more preferably 14 to 17 atomic %). The proportion of the starting material compounds can be determined such that the proportion of the elements contained in the starting material compounds is equivalent to the proportion of the elements contained in the target composite.

(2) Method for Producing Composite

The production method of the present invention uses the starting material compounds described above to prepare a mixture containing a lithium-containing compound, an iron-containing compound, a phosphorus-containing compound, a sulfur-containing compound, and a carbon-containing compound, and then performs electric current sintering and mechanical milling on the prepared mixture. The order of electric current sintering and mechanical milling is not particularly limited, but electric current sintering is preferably performed first, and mechanical milling is performed afterward.

(i) Electric Current Sintering

In the present invention, first, electric current sintering is preferably performed on the mixture containing a lithium-containing compound, an iron-containing compound, a phosphorus-containing compound, and a sulfur-containing compound. Specifically, the starting material mixture is packed into an electrically conductive die (an electron-conductive container), and a pulsed direct current (a technique, such as "spark-plasma-sintering," "pulsed electric current sintering," or "plasma activated sintering") is preferably applied to the electrically conductive die (an electron-conductive container) to heat the electrically conductive die (an electron-conductive container) by Joule heat. This heats the starting material mixture in the electrically conductive die (an electron-conductive container) to allow each element to diffuse and move, thereby suitably preparing an intermediate in which the elements are mixed together at their atomic level. This electric current sintering is preferably performed in a non-oxidizing atmosphere. This electric current sintering may be performed under ordinary pressure, but preferably under increased pressure. The carbon-containing compound for use as a starting material compound may be added at this stage, or may be added at the stage of mechanical milling described later. However, to prevent the reduction of materials (compositional change) during electric current sintering, it is preferable to add the carbon-containing compound at the stage of mechanical milling described later.

As a specific method, it is preferable to fill an electron-conductive container with the starting material mixture of a lithium-containing compound, an iron-containing compound, a phosphorus-containing compound, and a sulfur-containing compound, optionally with a carbon-containing compound (starting materials), and apply pulsed ON-OFF direct-current electricity to the mixture while applying pressure to the mixture preferably in a non-oxidizing atmosphere.

The material for the electrically conductive die (an electron-conductive container) is not particularly limited as long as the material has electrical conductivity. Examples of suitably usable materials include carbon (electrically conductive carbon materials), metals, alloys of the metals, oxides of the metals (e.g., iron, iron oxide, aluminum, and tungsten carbide), and mixtures of carbon and/or iron oxide with silicon nitride.

To inhibit the oxidation of sulfide, the electric current sintering is preferably performed in a non-oxidizing atmosphere, for example, in an inert gas atmosphere such as Ar or $N_2$, or in a reducing atmosphere, such as $H_2$. The atmosphere may also be under reduced pressure where the oxygen concentration is sufficiently low; for example, the oxygen partial pressure is about 20 Pa or less (in particular, 1 to 20 Pa).

In the specific treatment, if the electrically conductive die (an electron-conductive container) for use can ensure sufficient hermetic sealing, the inside of the container may be filled with a non-oxidizing atmosphere. The electrically conductive die (an electron-conductive container) may also not be completely hermetically sealed. When a semi-hermetically sealed container is used, the container may be placed inside a reaction chamber, and the inside of the reaction chamber may be filled with a non-oxidizing atmosphere. This enables the heating reaction of the starting material mixture described above to proceed in a non-oxidizing atmosphere. In this case, it is preferable to fill the inside of the reaction chamber with an inert gas atmosphere, a reducing gas atmosphere, or the like of about 0.01 MPa or more (in particular, about 0.05 to 0.2 MPa), for example.

Applying a pulsed direct current to the electrically conductive die (an electron-conductive container) filled with the starting material mixture heats the container with Joule heat, and heats the starting material mixture in the container to allow the starting materials to react each other, thereby forming an intermediate in which the atoms are mixed together. Because this method enables the production of the target intermediate in a short time of 30 minutes or less, little volatile Li, P, S, etc., is lost; thus, the intermediate maintains substantially the same compositional ratio of the starting materials as that of the starting materials in the mixture.

The heating temperature for electric current sintering is preferably within the range of 400 to 1,300° C. to sufficiently diffuse the constituent elements and allow them to mix with each other at atomic levels, while decreasing sulfur (free sulfur) that does not bind to a transition metal or a main-group element to thereby achieve a higher capacity, and to reduce the loss of elements such as Li, P, and S due to volatilization to thereby achieve a higher capacity. The time period during which the heating temperature is maintained within this range is preferably about 0 to 30 minutes to reduce the loss of elements such as Li, P, and S due to volatilization to thereby achieve a higher capacity. When the temperature has reached this temperature range, the application of electric current may be immediately ended to allow the heated mixture to cool down.

The increased pressure applied to the starting material powders is preferably, for example, about 5 to 60 MPa, and more preferably about 10 to 50 MPa to allow the starting materials to contact with each other more intensely to sufficiently diffuse the atoms during heating, thereby sufficiently causing a reaction between the atoms of the starting materials.

The apparatus for performing electric current sintering is not particularly limited as long as the apparatus can heat, cool, and pressure the starting material mixture, and can also apply electric current required for discharge. Examples of usable apparatuses include commercially available electric current sintering apparatuses (e.g., spark plasma sintering apparatuses). Such electric current sintering apparatuses and their mechanism are disclosed, for example, in JPH10-251070A.

Figure 1:
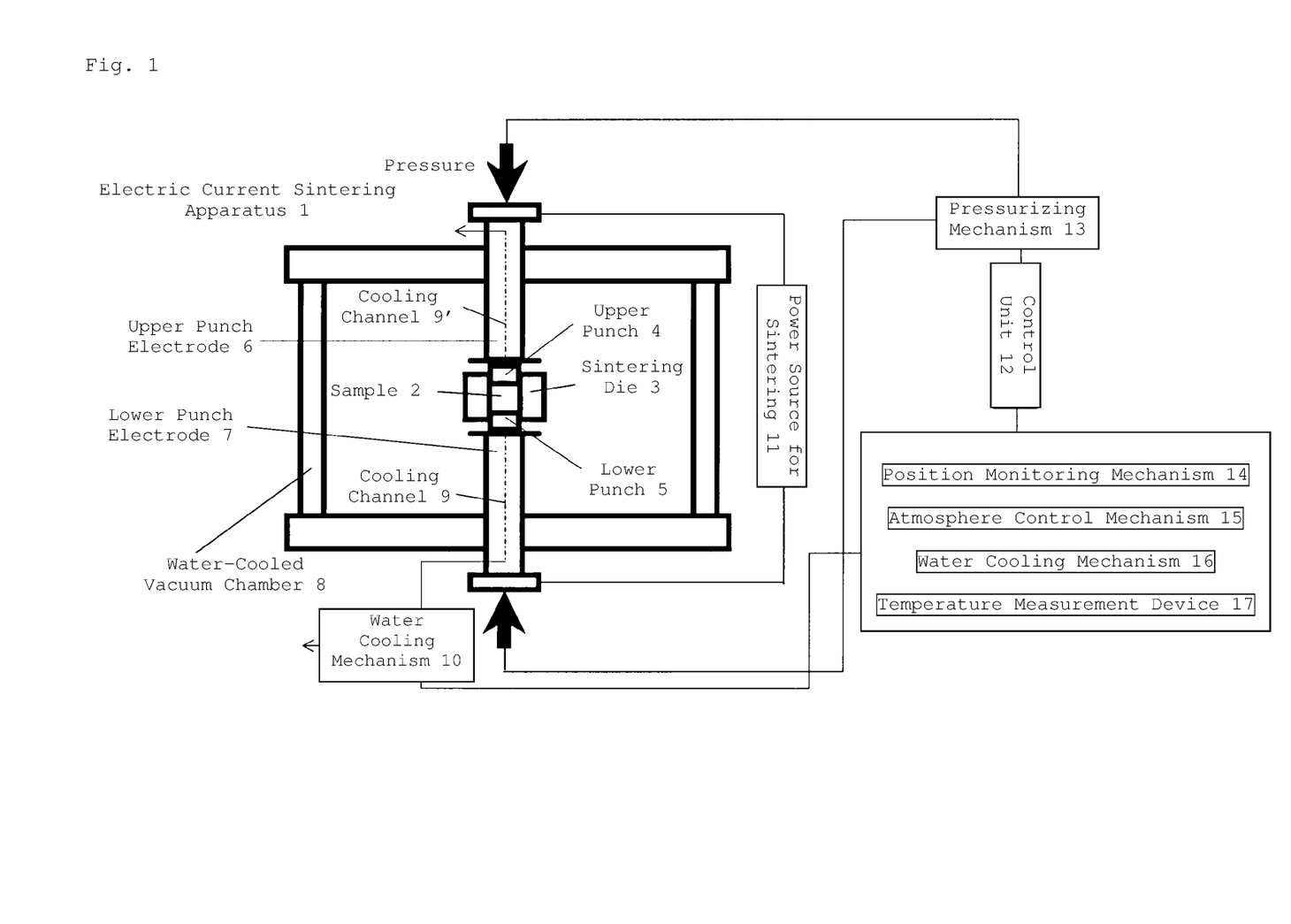
FIG. 1 is a schematic view showing an example of electric current sintering apparatuses for use in the present invention.

The following describes a specific example of the electric current sintering step of the present invention with reference to FIG. 1, which shows a diagram of an electric current sintering apparatus. Note that the electric current sintering apparatus for use in the present invention is not limited to the apparatus described below.

Electric current sintering apparatus 1, shown in FIG. 1, comprises sintering die (electron-conductive container) 3 in which sample 2 is packed; and comprises punches 4 and 5, which are a pair of up and down punches. Punches 4 and 5 are supported by punch electrodes 6 and 7, respectively, and can apply a pulsed current through these punch electrodes 6 and 7 to sample 2 packed in sintering die 3, while optionally applying pressure to sample 2. The material for sintering die 3 is not limited, and examples of the material include carbon materials, such as graphite.

In the sintering apparatus shown in FIG. 1, the current-carrying part, which includes electron-conductive container 3, punches 4 and 5 for passing an electric current, and punch electrodes 6 and 7, all described above, is accommodated inside water-cooled vacuum chamber 8. The inside of the chamber can be adjusted to have a predetermined atmosphere by atmosphere control mechanism 15. It is preferable to adjust the inside of the chamber to form a non-oxidizing atmosphere by using atmosphere control mechanism 15.

Control unit 12 drives and controls pressurizing mechanism 13, pulsed power supply 11, atmosphere control mechanism 15, water-cooling mechanisms 16 and 10, and temperature measurement device 17. Control unit 12 drives pressurizing mechanism 13 to thereby cause punch electrodes 6 and 7 to apply a predetermined pressure to the starting material mixture.

The pulsed current to be applied for heating may be, for example, pulsed ON-OFF direct-current electricity having a pulse width of about 2 to 3 milliseconds and a frequency of about 3 to 300 Hz. The specific current value varies depending on the type, size, and other factors of the electrically conductive die (an electron-conductive container), and the value is preferably determined such that the temperature falls within the range described above. For example, when a graphite die having an inner diameter of 15 mm is used, about 200 to 1,000 A is suitable. When a graphite die having an inner diameter of 100 mm is used, about 1,000 to 8,000 A is suitable. When performing electric current sintering, it is preferable to control the current value to achieve a predetermined temperature by increasing or decreasing the current value while monitoring the temperature of the die.

To have the starting material mixture under increased pressure, pressure can be applied, for example, through punch electrodes 6 and 7 to the starting material mixture packed in electron-conductive container 3, described above.

(ii) Mechanical Milling

The target composite of the present invention (the lithium-iron-phosphorus-sulfur-carbon composite) can be obtained by subjecting the intermediate obtained in the electric current sintering described above to mechanical milling, and then subjecting the resultant to mixing, pulverization, and reaction. When the starting materials for use in the electric current sintering step do not contain a predetermined amount of a carbon-containing compound, the intermediate and a carbon-containing compound can be mixed before performing mechanical milling.

Mechanical milling is a method for milling and mixing starting materials while adding mechanical energy to the materials to cause a reaction. This method adds mechanical shock or friction to starting materials to thereby mill and mix the materials, and allows the compounds contained in the starting materials to intensively come into contact one another, thus giving submicron particles; thus, this method easily forms a metastable phase. In the present invention, the mechanical milling forms a metastable lithium-iron-phosphorus-sulfur compound, which is difficult to produce only by the heating treatment in the electric current sintering step, and also stabilizes the compound by forming it into submicron particles. Moreover, the addition of carbon in the form of a carbon-containing compound can provide excellent electrical conductivity.

Examples of mechanical milling apparatuses for use include ball mills, vibrational mills, turbo mills, and disc mills. Of these, vibrational mills are preferable.

The mechanical milling is preferably performed in a non-oxidizing atmosphere, for example, an inert gas atmosphere, such as Ar or $N_2$, or a reducing atmosphere, such as $H_2$, to inhibit the oxidation of sulfide. The atmosphere may also be under reduced pressure where the oxygen concentration is sufficiently low; for example, the oxygen partial pressure is about 20 Pa or less (in particular, 1 to 20 Pa).

The temperature for performing the mechanical milling is preferably about 200° C. or less to suppress the volatilization of sulfur and facilitate the formation of the target composite having a high sulfur content.

The time period for performing the mechanical milling is not particularly limited. The mechanical milling is preferably performed until the obtained composite achieves a crystallite size of 80 nm or less, in particular, 60 nm or less, or even 50 nm or less.

(3) Lithium Ion Secondary Battery

The composite of the present invention (the lithium-iron-phosphorus-sulfur-carbon composite) can be effectively used as an electrode active material (in particular, a cathode active material) of lithium batteries (in particular, lithium ion secondary batteries), such as lithium primary batteries, lithium-ion secondary batteries, and metal lithium secondary batteries, taking advantage of the excellent characteristics described above. The composite of the present invention (the lithium-iron-phosphorus-sulfur-carbon composite) is a material that enables charge and discharge from charge, particularly because of the lithium content in the structure. In addition, the composite is useful as an electrode active material (in particular, a cathode active material) for lithium-ion secondary batteries, particularly due to the excellent cycle characteristics. A lithium-ion secondary battery including the composite of the present invention (the lithium-iron-phosphorus-sulfur-carbon composite) as an electrode active material (in particular, a cathode active material) may be used as either a non-aqueous electrolyte lithium-ion secondary battery containing, as an electrolyte, a non-aqueous solvent-based electrolyte, or an all-solid-state lithium-ion secondary battery containing, as an electrolyte, a lithium ion conductive solid electrolyte.

The non-aqueous electrolyte lithium-ion secondary battery and all-solid-state lithium-ion secondary battery may have the same structure as that of a known lithium-ion secondary battery, except for the use of the composite of the present invention (the lithium-iron-phosphorus-sulfur-carbon composite) as an electrode active material (in particular, a cathode active material).

For example, the non-aqueous electrolyte lithium-ion secondary battery may have the same basic structure as that of a known non-aqueous electrolyte lithium-ion secondary battery, except for the use of the composite of the present invention (the lithium-iron-phosphorus-sulfur-carbon composite), described above, as an electrode active material (in particular, a cathode active material).

Regarding the cathode, the composite of the present invention (the lithium-iron-phosphorus-sulfur-carbon composite), described above, may be used as a cathode active material. For example, a mixed cathode prepared by mixing the composite of the present invention (the lithium-iron-phosphorus-sulfur-carbon composite) with a conductive material and a binder may be supported by a cathode collector, such as Al, Ni, stainless, or carbon cloth. Examples of conductive materials for use include carbon materials, such as graphite, cokes, carbon black, and acicular carbon. When the composite of the present invention (the lithium-iron-phosphorus-sulfur-carbon composite) is used as an anode active material, a known material can be used as a cathode.

An anode for use may be either a lithium-containing material or a lithium-free material. Examples include metal lithium, tin, silicon, alloys containing these metals, and SiO, as well as graphite and sintering-resistant carbon. These anode active materials may also optionally be supported by an anode collector, such as Al, Cu, Ni, stainless, or carbon using the conductive materials described above, binders, etc. The composite of the present invention (the lithium-iron-phosphorus-sulfur-carbon composite) can also be used as an anode active material.

Examples of separators for use include materials in the form of porous film, non-woven fabric, and woven fabric that are made of polyolefin resin, such as polyethylene and polypropylene, fluororesin, nylon, aromatic aramid, inorganic glass, etc.

The solvent usable for non-aqueous electrolytes include known solvents for non-aqueous solvent-based secondary batteries, such as carbonates, ethers, nitriles, and sulfur-containing compounds.

The all-solid-state lithium-ion secondary battery may also have the same structure as that of a known all-solid-state lithium-ion secondary battery, except for the use of the composite of the present invention (the lithium-iron-phosphorus-sulfur-carbon composite) as an electrode active material (in particular, a cathode active material).

In this case, examples of usable lithium-ion conductive solid electrolytes include polymer-based solid electrolytes such as polyethylene oxide-based polymers and polymers containing at least one of a polyorganosiloxane chain and a polyoxyalkylene chain; sulfide-based solid electrolytes; and oxide-based solid electrolytes.

Regarding the cathode of all-solid-state lithium-ion secondary batteries, the composite of the present invention (the lithium-iron-phosphorus-sulfur-carbon composite) can be used, for example, as a cathode active material. A mixed cathode containing the composite of the present invention (the lithium-iron-phosphorus-sulfur-carbon composite), a conductive material, a binder, and a solid electrolyte may be supported by a cathode collector, such as Ti, Al, Ni, and stainless. Examples of usable conductive materials include carbon materials, such as graphite, cokes, carbon black, and acicular carbon, as with the non-aqueous solvent-based secondary batteries.

There is no particular limitation on the shape of non-aqueous electrolyte lithium-ion secondary batteries and all-solid-state lithium-ion secondary batteries. These batteries may have any shape, such as a cylindrical shape or prismatic shape.

EXAMPLES

The following Examples and Comparative Examples describe the present invention in detail. However, the present invention is, needless to say, not limited to these Examples.

Example 1

Commercially available spongy iron (Fe) (Junsei Chemical Co., Ltd., mean particle size: about 30 μm), commercially available red phosphorus (P) (Kishida Chemical Co., Ltd., mean particle size: about 20 μm), and commercially available sulfur (S) (Wako Pure Chemical Industries, Ltd., mean particle size: about 20 μm) were mixed to give a molar ratio of 1:2:6, and then heated at 550° C., thereby preparing iron phosphorus trisulfide ($FePS_3$). This $FePS_3$ and commercially available lithium sulfide (Mitsuwa Chemicals Co., Ltd., $Li_2S$, mean particle size: about 16 μm) were weighed to give a molar ratio of 1:4 in an argon gas atmosphere in a glove box (dew point: −80° C.), fully mixed in a mortar, and packed into a graphite die having an inner diameter of 15 mm.

Subsequently, the graphite die filled with the starting materials was placed in an electric current sintering apparatus. The graphite die and the current-carrying part, which contains electrode portions, were housed in a vacuum chamber. The inside atmosphere of the chamber was degassed under vacuum (about 20 Pa), and filled with high-purity argon gas (oxygen concentration: about 0.2 ppm) until the pressure reached atmospheric pressure.

Thereafter, a pulsed current of about 600 A (pulse width: 2.5 milliseconds, frequency: 28.6 Hz) was applied to the starting materials packed in the graphite die, while pressure of about 30 MPa was applied to the materials. The vicinity of the graphite die was heated at a heating rate of about 150° C./minute, and the temperature reached 600° C. 4 minutes after the start of pulsed current application. The current application and pressure application were immediately ended to allow the resultant to naturally cool down.

After the temperature was decreased to room temperature, a graphite jig was moved into the glove box filled with an argon gas atmosphere at a dew point of −80° C., and the reaction product of $FePS_3$ and $Li_2S$ was withdrawn from the die, followed by pulverization using a mortar. The pulverized product was mixed with a commercially available acetylene black (AB) powder (Denka Company Limited, mean particle size: about 0.04 μm) to give a weight ratio of the $FePS_3$—$Li_2S$ reaction product to AB of 9:1, fully mixed with a mortar, and placed in a zirconia pot in an argon gas atmosphere, followed by mechanical milling for 8 hours using a vibrating-cup mill (model MC-4A) produced by Ito Seisakusho Co., Ltd. The proportion of each element used for the starting materials (atomic %) (in the composite) was as follows: Li 39.2%, Fe 4.9%, P 4.9%, S 34.3%, and C 16.6%.

Figure 2:
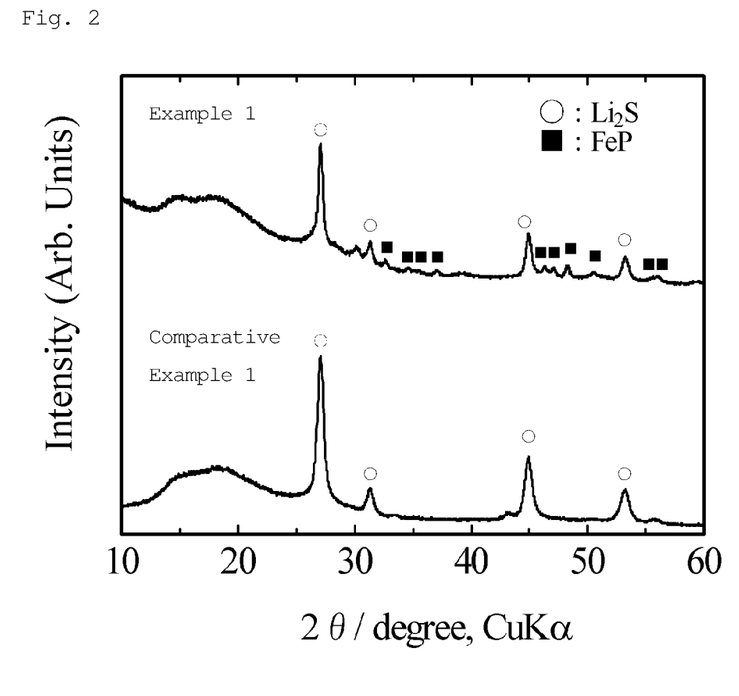
FIG. 2 shows X-ray diffraction patterns of the samples obtained in Example 1 and Comparative Example 1.

FIG. 2 shows an X-ray diffraction pattern of the obtained sample. As shown in FIG. 2, the peaks assigned to $Li_2S$ were observed as the main phase, and, in addition, the peaks of FeP were observed as a trace amount of impurities. The proportion (mol %) of FeP estimated in Rietveld analysis was about 7.6% (i.e., the proportion of $Li_2S$ was 92.4 mol %). The crystallite size estimated from the half-width of the diffraction peak based on the (111) plane of $Li_2S$ was about 42 nm. As described, this method prepared a lithium-iron-phosphorus-sulfur-carbon composite containing lithium sulfide as the main phase with a crystallite size of 50 nm or less.

A charge and discharge test was conducted by starting from charge in galvanostatic measurement at a current density of 46.7 mAh/g and a cutoff voltage of 1.0 to 3.0 V, using the obtained composite powder as a cathode active material for a lithium secondary battery, metal lithium as an anode, an aluminum mesh as a collector, and $LiPF_6$ dissolved in an ethylene carbonate/dimethyl carbonate mixture liquid as an electrolyte.

Figure 3:
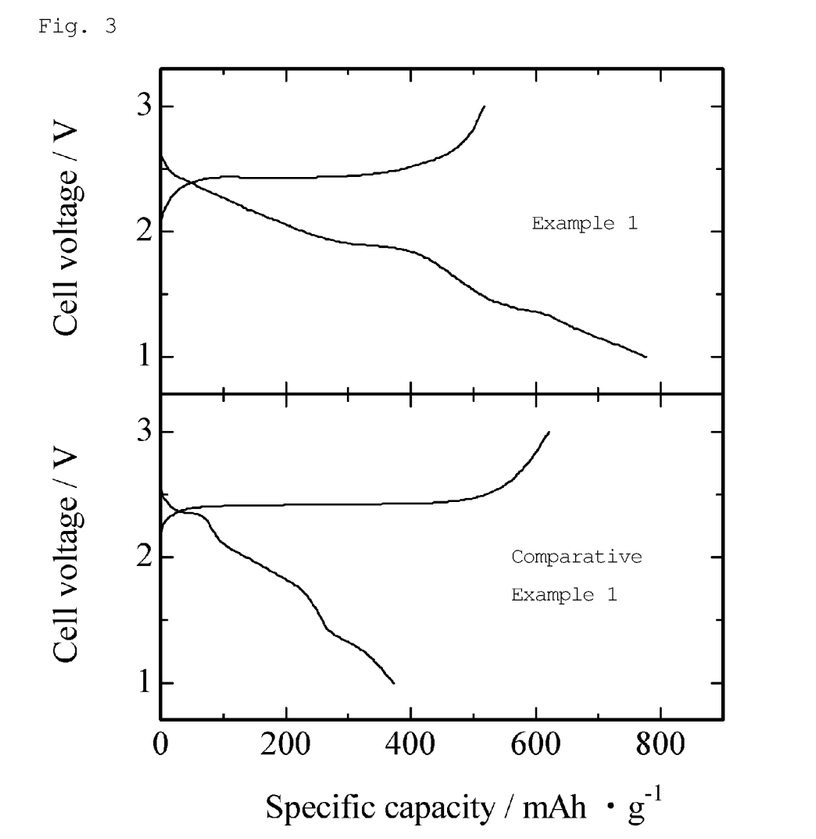
FIG. 3 is a graph showing the charge and discharge characteristics of lithium secondary batteries using the samples obtained in Example 1 and Comparative Example 1 as a cathode active material.

FIG. 3 shows the charge and discharge characteristics. As shown in FIG. 3, the initial discharge capacity was about 780 mAh/g, which was significantly higher than in the sample measured in Comparative Example 1 described below (initial discharge capacity: about 370 mAh/g). Although the sample of Example 1 exhibited a slightly lower charge capacity than the sample of Comparative Example 1, the sample of Example 1 attained a high discharge capacity regardless of its charge capacity.

The results indicate that the preparation of a lithium-iron-phosphorus-sulfur-carbon composite under the conditions adopted in the present invention provided a high-capacity electrode material (in particular, a high-discharge capacity electrode material).

Comparative Example 1

The procedure of Example 1 was repeated, except that the starting material $FePS_3$ was replaced by $FeS_2$, thereby preparing a composite powder. More specifically, commercially available iron sulfide ($FeS_2$) (Alfa Aesar, mean particle size: about 6 μm) and commercially available lithium sulfide ($Li_2S$) (Mitsuwa Chemicals Co., Ltd., mean particle size: about 16 μm) were mixed to give a molar ratio of 1:4, and subjected to electric current sintering at 600° C. The obtained product was mixed with a commercially available acetylene black (AB) powder (Denka Company Limited, mean particle size: about 0.04 μm) to give a weight ratio of the $FeS_2$—$Li_2S$ reaction product to AB of 9:1, followed by mechanical milling for 8 hours, thereby preparing a composite. The proportion (atomic %) of each element used for the starting materials (in the composite) was as follows: Li 44.9%, Fe 5.6%, S 33.7%, and C 15.8%.

FIG. 2 shows an X-ray diffraction pattern of the obtained sample. As shown in FIG. 2, the composite of Comparative Example 1 shows only $Li_2S$-derived peaks, and the crystallite size estimated from the half-width of the diffraction peak based on the (111) plane was about 29 nm.

A charge and discharge test was conducted in exactly the same manner as in Example 1, except that this composite powder was used as a cathode active material for a lithium secondary battery. FIG. 3 shows the charge and discharge characteristics. The initial discharge capacity was about 370 mAh/g, which was significantly lower than in the composite obtained in Example 1 (initial discharge capacity: about 780 mAh/g). The results indicate that although the prepared phosphorus-free lithium-iron-sulfur-carbon composite contained lithium sulfide as the main phase and had a crystallite size of 50 nm or less, the use of the composite as a cathode active material for a lithium secondary battery did not attain a high capacity (in particular, a high discharge capacity).

Example 2

The procedure of Example 1 was repeated, except that the molar ratio of $FePS_3$ to lithium sulfide ($Li_2S$) was 1:5 and the heating treatment was performed at 1200° C. with an electric current sintering apparatus, thereby preparing a lithium-iron-phosphorus-sulfur-carbon composite. The proportion (atomic %) of each element used for the starting materials (in the composite) was as follows: Li 42.0%, Fe 4.2%, P 4.2%, S 33.6%, and C 16.0%.

Figure 4:
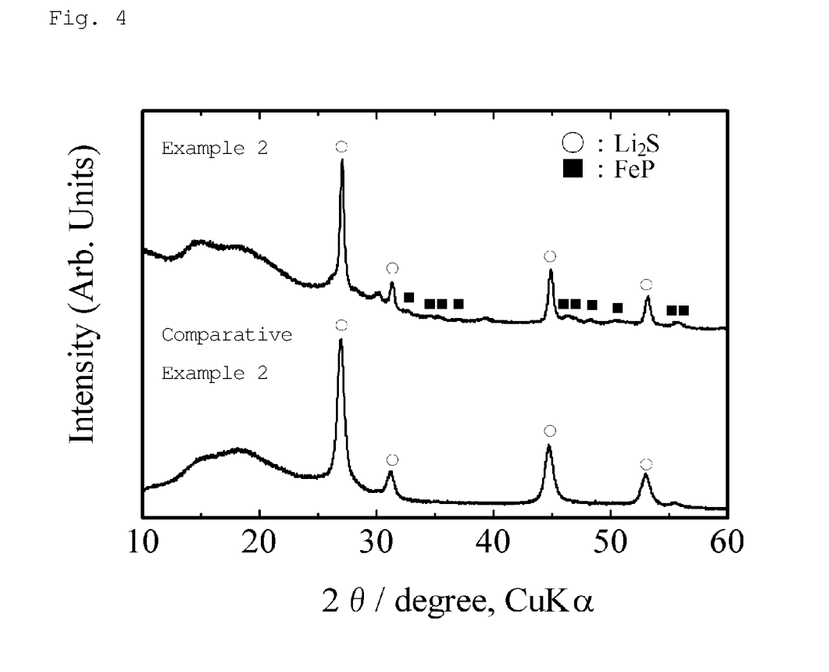
FIG. 4 shows X-ray diffraction patterns of the samples obtained in Example 2 and Comparative Example 2.

FIG. 4 shows an X-ray diffraction pattern of the obtained sample. As shown in FIG. 4, the peaks assigned to $Li_2S$ were observed as the main phase, and the peaks of FeP were also observed as a trace amount of impurities. The proportion (mol %) of FeP estimated in Rietveld analysis was about 4.4% (i.e., the proportion of $Li_2S$ was 95.6 mol %). The crystallite size estimated from the half-width of the diffraction peak based on the (111) plane of $Li_2S$ was about 47 nm. As described, this method prepared a lithium-iron-phosphorus-sulfur-carbon composite containing lithium sulfide as the main phase with a crystallite size of 50 nm or less.

Figure 5:
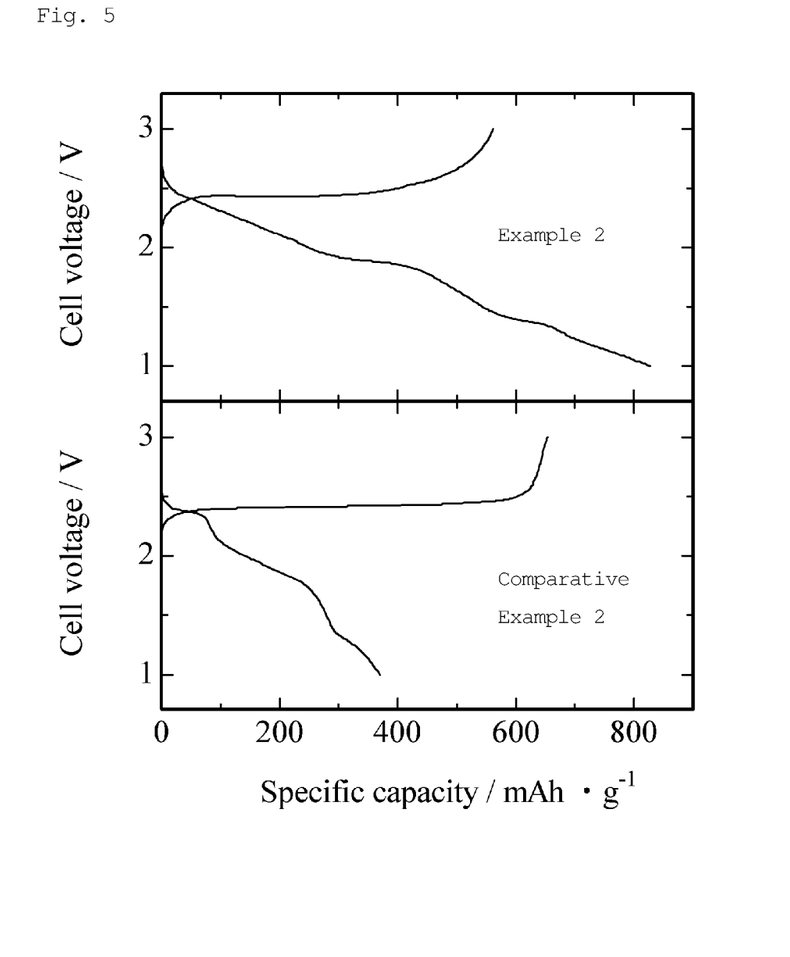
FIG. 5 is a graph showing the charge and discharge characteristics of lithium secondary batteries using the samples obtained in Example 2 and Comparative Example 2 as a cathode active material.

A charge and discharge test was conducted in exactly the same manner as in Example 1, except that this composite powder was used as a cathode active material for a lithium secondary battery. FIG. 5 shows the charge and discharge characteristics. As shown in FIG. 5, the initial discharge capacity was about 830 mAh/g, which was significantly higher than in the sample measured in Comparative Example 2, described later (initial discharge capacity: about 370 mAh/g). Although the sample of Example 2 exhibited a slightly lower charge capacity than the sample of Comparative Example 2, the sample of Example 1 attained a high discharge capacity regardless of its charge capacity.

The results indicate that the preparation of a lithium-iron-phosphorus-sulfur-carbon composite under the conditions adopted in the present invention provided a high-capacity electrode material (in particular, a high-discharge capacity electrode material).

Comparative Example 2

Exactly the same procedure as in Example 2 was repeated, except that commercially available iron sulfide ($FeS_2$) (Alfa Aesar, mean particle size: about 6 μm) instead of $FePS_3$ was used as a starting material, thereby preparing a composite powder. The proportion (atomic %) of each element used for the starting materials (in the composite) was as follows: Li 47.1%, Fe 4.7%, S 33.0%, and C 15.2%.

FIG. 4 shows an X-ray diffraction pattern of the obtained sample. As shown in FIG. 4, the composite of Comparative Example 2 exhibited only $Li_2S$-derived peaks, and the crystallite size estimated from the half-width of the diffraction peak based on the (111) plane was about 27 nm.

A charge and discharge test was conducted in exactly the same manner as in Example 2, except that this composite powder was used as a cathode active material for a lithium secondary battery. FIG. 5 shows the charge and discharge characteristics. As shown in FIG. 5, the initial discharge capacity was about 370 mAh/g, which was significantly lower than in the composite obtained in Example 2 (initial discharge capacity: about 830 mAh/g). The results indicate that although the prepared phosphorus-free lithium-iron-sulfur-carbon composite contained lithium sulfide as the main phase and had a crystallite size of 50 nm or less, the use of the composite as a cathode active material for a lithium secondary battery did not attain a high capacity (in particular, a high discharge capacity).

Example 3

Exactly the same procedure as in Example 2 was repeated, except that the molar ratio of $FePS_3$ to lithium sulfide ($Li_2S$) was 1:6, thereby preparing a lithium-iron-phosphorus-sulfur-carbon composite. The proportion (atomic %) of each element used for the starting materials (in the composite) was as follows: Li 44.0%, Fe 3.7%, P 3.7%, S 33.0%, and C 15.6%.

Figure 6:
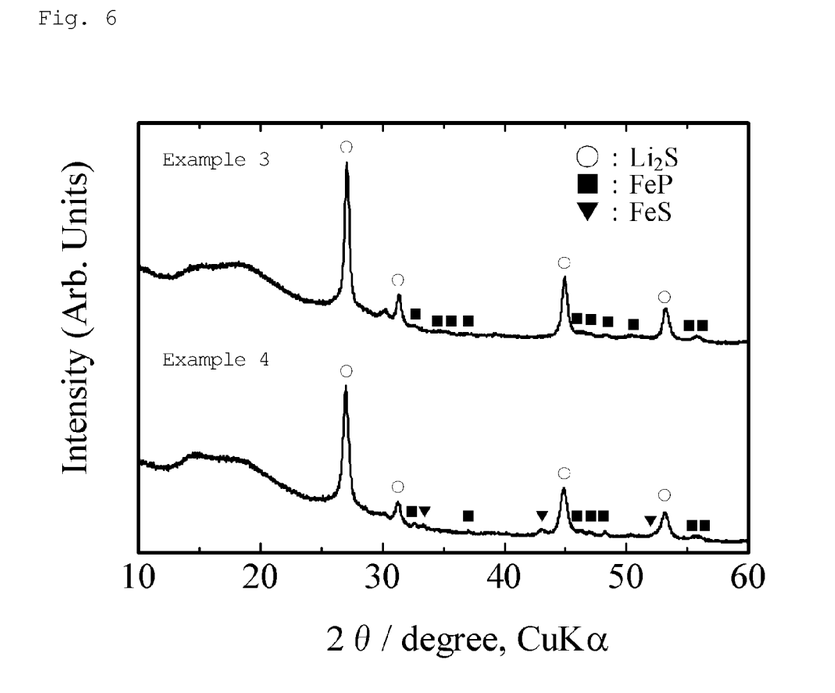
FIG. 6 shows X-ray diffraction patterns of the samples obtained in Examples 3 and 4.

FIG. 6 shows an X-ray diffraction pattern of the obtained sample. As shown in FIG. 6, the peaks assigned to $Li_2S$ were observed as the main phase, and the peaks of FeP were also observed as a trace amount of impurities. The proportion (mol %) of FeP estimated in Rietveld analysis was about 0.1% (i.e., the proportion of $Li_2S$ was 99.9 mol %). The crystallite size estimated from the half-width of the diffraction peak based on the (111) plane of $Li_2S$ was about 41 nm. As described, this method prepared a lithium-iron-phosphorus-sulfur-carbon composite containing lithium sulfide as the main phase with a crystallite size of 50 nm or less.

Figure 7:
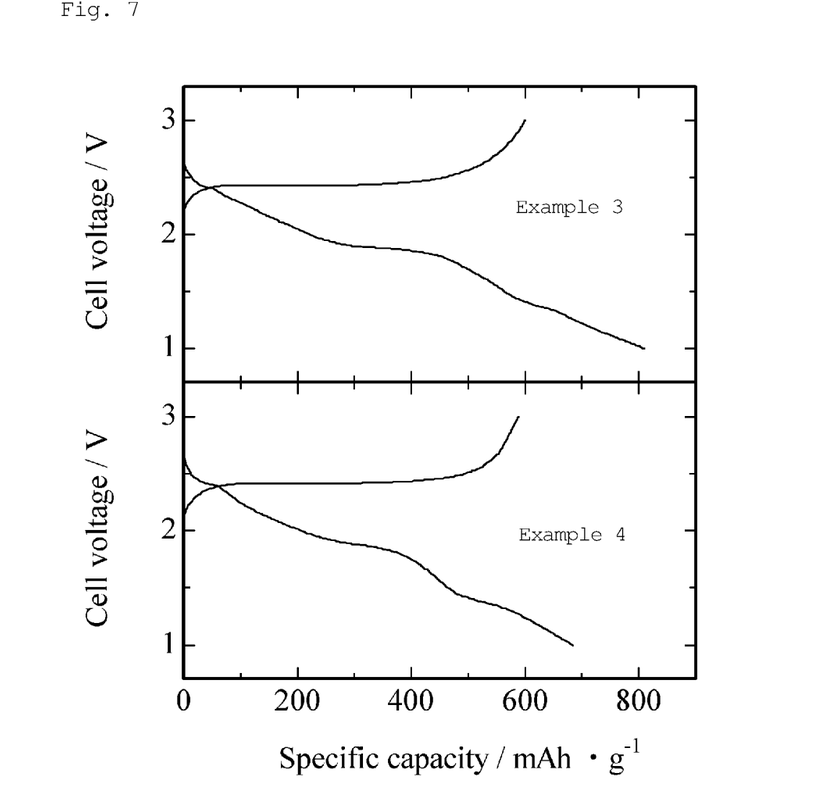
FIG. 7 is a graph showing the charge and discharge characteristics of lithium secondary batteries using the samples obtained in Examples 3 and 4 as a cathode active material.

A charge and discharge test was conducted in exactly the same manner as in Example 1, except that this composite powder was used as a cathode active material for a lithium secondary battery. FIG. 7 shows the charge and discharge characteristics. As shown in FIG. 7, the initial discharge capacity was about 810 mAh/g, which was substantially as high as in the samples measured in Examples 1 and 2 (the respective initial discharge capacity: about 780 and 830 mAh/g).

The results indicate that the preparation of a lithium-iron-phosphorus-sulfur-carbon composite under the conditions adopted in the present invention provided a high-capacity electrode material (in particular, a high-discharge capacity electrode material).

Example 4

Exactly the same procedure as in Example 1 was repeated, except that as a starting material, a powder obtained by mixing iron sulfide ($FeS_2$), lithium sulfide ($Li_2S$), and red phosphorus (P) to give a molar ratio of 1:4:0.5 was used, and that heating treatment was performed by electric current sintering at 600° C. for 10 minutes, thereby preparing a lithium-iron-phosphorus-sulfur-carbon composite. The proportion (atomic %) of each element used for the starting materials (in the composite) was as follows: Li 43.4%, Fe 5.4%, P 2.7%, S 32.5%, and C 16.0%.

FIG. 6 shows an X-ray diffraction pattern of the obtained sample. As shown in FIG. 6, the peaks assigned to $Li_2S$ were observed as the main phase, and the peaks of FeP and FeS were also observed as a trace amount of impurities. The proportion (mol %) of FeP and FeS estimated in Rietveld analysis was about 2.2% and about 1.6%, respectively (i.e., the proportion of $Li_2S$ was 96.2 mol %). The crystallite size estimated from the half-width of the diffraction peak based on the (111) plane of $Li_2S$ was about 36 nm. As described, this method prepared a lithium-iron-phosphorus-sulfur-carbon composite containing lithium sulfide as the main phase with a crystallite size of 50 nm or less.

A charge and discharge test was conducted in exactly the same manner as in Example 1, except that this composite powder was used as a cathode active material for a lithium secondary battery. FIG. 7 shows the charge and discharge characteristics. As shown in FIG. 7, the initial discharge capacity was about 680 mAh/g, which was substantially as high as in the sample measured in Example 1 (initial discharge capacity: about 780 mAh/g).

The results indicate that the preparation of a lithium-iron-phosphorus-sulfur-carbon composite under the conditions adopted in the present invention provided a high-capacity electrode material (in particular, a high-discharge capacity electrode material).

Comparative Example 3

Exactly the same procedure as in Example 4 was repeated, except that the molar ratio of iron sulfide ($FeS_2$), lithium sulfide ($Li_2S$), and red phosphorus (P) used as starting materials was 1:4:1, thereby preparing a lithium-iron-phosphorus-sulfur-carbon composite of Comparative Example 3. The proportion (atomic %) of each element used for the starting materials was as follows: Li 41.9%, Fe 5.2%, P 5.2%, S 31.4%, and C 16.2%.

Figure 8:
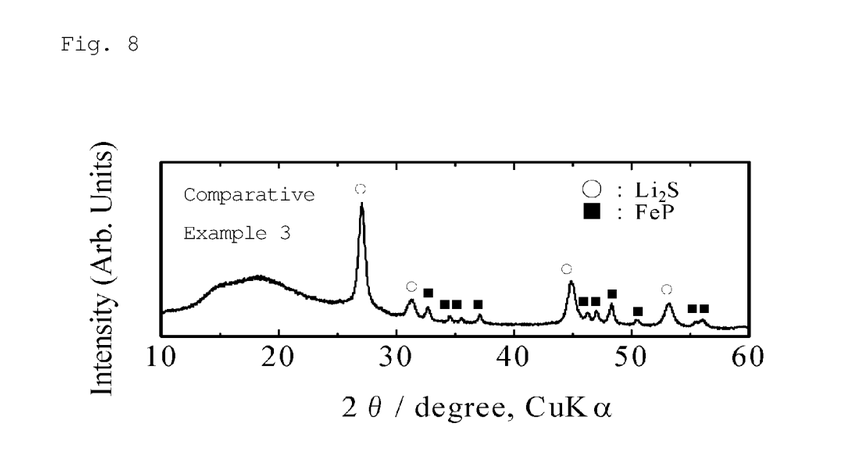
FIG. 8 shows an X-ray diffraction pattern of the sample obtained in Comparative Example 3.

FIG. 8 shows an X-ray diffraction pattern of the obtained sample. As shown in FIG. 8, the peaks assigned to $Li_2S$ were observed as the main phase, and the peaks of FeP were also observed as impurities. The proportion (mol %) of FeP estimated in Rietveld analysis was about 10.2% (i.e., the proportion of $Li_2S$ was 89.8 mol %). The crystallite size estimated from the half-width of the diffraction peak based on the (111) plane of $Li_2S$ was about 30 nm. As described, even the lithium-iron-phosphorus-sulfur-carbon composite with a crystallite size of 50 nm or less prepared by this method contained impurities (FeP) in an amount of 10 mol % or more when the phosphorus content exceeded 5 atomic %.

Figure 9:
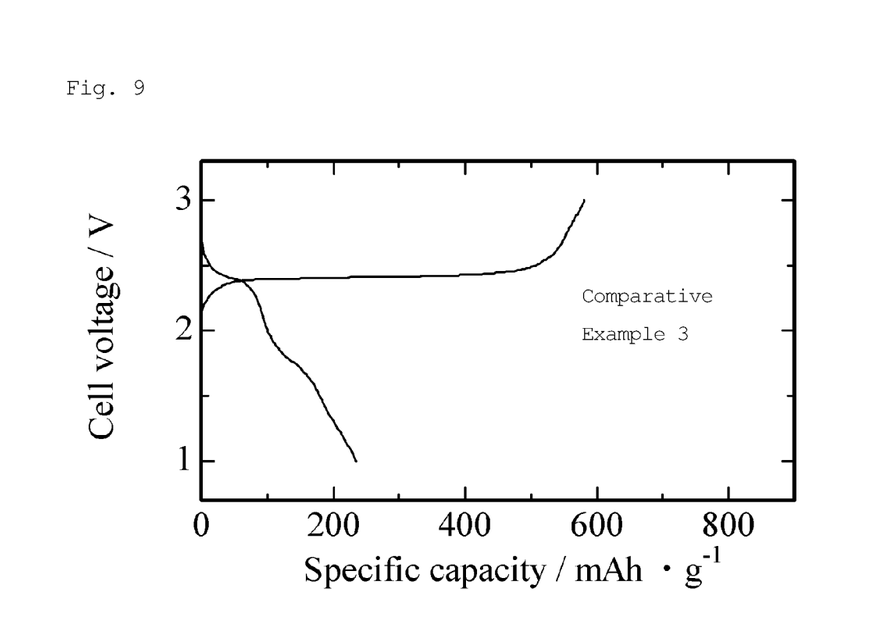
FIG. 9 is a graph showing the charge and discharge characteristics of a lithium secondary battery using the sample obtained in Comparative Example 3 as a cathode active material.

A charge and discharge test was conducted in exactly the same manner as in Example 4, except that this composite powder was used as a cathode active material for a lithium secondary battery. FIG. 9 shows the charge and discharge characteristics. As shown in FIG. 9, the initial discharge capacity was about 230 mAh/g, which was significantly lower than in the sample measured in Example 4 (initial discharge capacity: about 680 mAh/g).

The results indicate that the phosphorus content exceeding 5 atomic % provided only the composite containing impurities (FeP) in an amount of 10 mol % or more, although the crystallite size was 50 nm or less. The use of the composite as a cathode active material for a lithium secondary battery did not attain a high capacity (in particular, a high-discharge capacity).

Example 5

An all-solid-state battery was assembled using the lithium-iron-phosphorus-sulfur-carbon composite obtained in Example 1 as a cathode active material, metal indium as an anode, and $75Li_2S$-$25P_2S_5$ as an electrolyte. Subsequently, a charge and discharge test was conducted.

The lithium-iron-phosphorus-sulfur-carbon composite described above and $75Li_2S$-$25P_2S_5$ electrolyte were mixed to give a weight ratio of 7:3, and used as a mixed cathode. The mixed cathode, 75Li2S-25P2S5 electrolyte, and indium foil were stacked in series, and the laminated "mixed cathode/75Li2S-25P2S5 electrolyte/indium foil" was molded by applying pressure, thereby preparing a pellet battery with a diameter of 10 mm. A charge and discharge test was then conducted using this battery by galvanostatic measurement at a current density of 11.7 mA/g (74 µA/cm$^2$) and at a cutoff voltage of 0.4-3.0 V by starting from charge.

Figure 10:
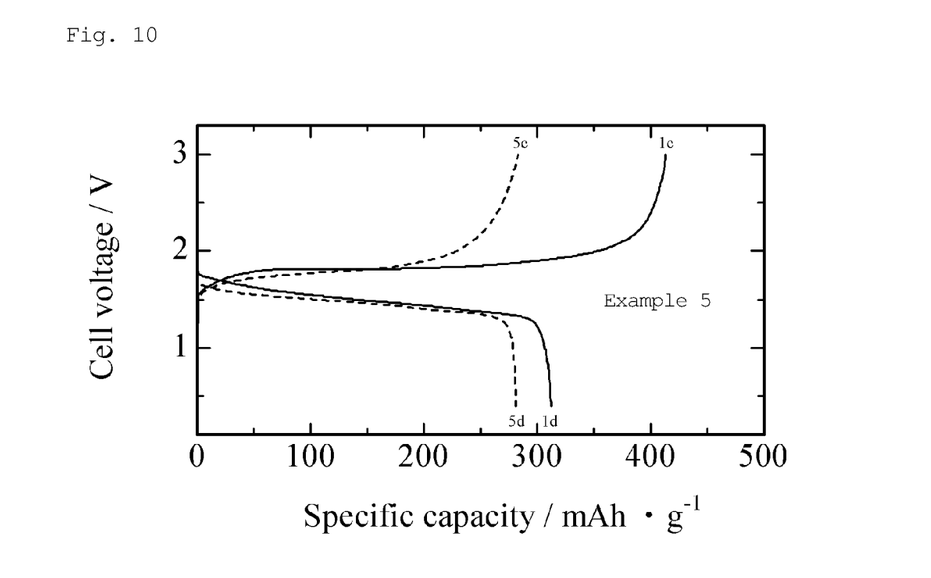
FIG. 10 is a graph showing the charge and discharge characteristics of an all-solid-state lithium-ion secondary battery using the sample obtained in Example 5 as a cathode active material.

FIG. 10 shows the charge and discharge characteristics. As shown in FIG. 10, the initial discharge capacity was about 310 mAh/g, and the discharge capacity after 5 cycles was about 280 mAh/g (capacity retention: about 90%), demonstrating a relatively excellent reversible cycle.

The results indicate that the preparation of a lithium-iron-phosphorus-sulfur-carbon composite under the conditions adopted in the present invention and the use of the composite as a cathode active material for an all-solid-state battery led the all-solid-state battery to exhibit excellent reversible cycle characteristics.

DESCRIPTION OF THE REFERENCE NUMERALS

1 Electric current sintering apparatus
2 Sample
3 Sintering die (electron-conductive container)
4, 5 Punch
6,7 Punch electrode
8 Water-cooled vacuum chamber
9, 9' Cooling channel
10, 16 Water-cooling mechanism
11 Power source for sintering
12 Control unit
13 Pressurizing mechanism
14 Position-monitoring mechanism
15 Atmosphere control mechanism
17 Temperature measurement device

The invention claimed is:

1. A composite comprising, as constituent elements, lithium, iron, phosphorus, sulfur, and carbon,
wherein lithium sulfide ($Li_2S$) is present in an amount of 90 mol % or more, and
wherein the crystallite size calculated from a half-width of a diffraction peak based on the (111) plane of $Li_2S$ as determined by X-ray powder diffraction measurement is 80 nm or less.

2. The composite according to claim 1 wherein
the Li content is 30 to 55 atomic %,
the Fe content is 2 to 7 atomic %,
the P content is 1 to 5 atomic %,
the S content is 25 to 40 atomic %, and
the C content is 8 to 25 atomic %.

3. A method for producing the composite according to claim 1, the method comprising
subjecting a mixture containing a lithium-containing compound, an iron-containing compound, a phosphorus-containing compound, a sulfur-containing compound, and a carbon-containing compound to electric current sintering and mechanical milling.

4. The production method according to claim 3 wherein the electric current sintering and the mechanical milling are performed such that after the mixture containing a lithium-containing compound, an iron-containing compound, a phosphorus-containing compound, and a sulfur-containing compound is subjected to the electric current sintering, an obtained electric-current sintered product is subjected to the mechanical milling together with a carbon-containing compound.

5. The production method according to claim 4 wherein the mixture containing a lithium-containing compound, an iron-containing compound, a phosphorus-containing compound, and a sulfur-containing compound is a mixture of lithium sulfide and iron phosphorus trisulfide, and/or a mixture of lithium sulfide, iron sulfide, and phosphorus.

6. The production method according to claim 3 wherein the electric current sintering and/or the mechanical milling is performed in a non-oxidizing atmosphere.

7. The production method according to claim 3 wherein the electric current sintering and/or the mechanical milling is performed in an electric currently conductive die.

8. The production method according to claim 3 wherein the electric current sintering and/or the mechanical milling is performed under increased pressure.

9. An electrode active material for a lithium battery, the material comprising the composite according to claim 1.

10. A lithium battery comprising, as a constituent element, the electrode active material for a lithium battery according to claim 9.

11. The lithium battery according to claim 10 that is a lithium-ion secondary battery.

12. An all-solid-state lithium-ion secondary battery comprising, as constituent elements,
the electrode active material for a lithium battery according to claim 9 and
a lithium-ion conductive solid electrolyte.

13. The all-solid-state lithium-ion secondary battery according to claim 12 wherein the lithium-ion conductive solid electrolyte is at least one member selected from the group consisting of polymer-based solid electrolytes, sulfide-based solid electrolytes, and oxide-based solid electrolytes.

14. A method for producing the composite according to claim 2, the method comprising
subjecting a mixture containing a lithium-containing compound, an iron-containing compound, a phosphorus-containing compound, a sulfur-containing compound, and a carbon-containing compound to electric current sintering and mechanical milling.

15. The production method according to claim 4 wherein the electric current sintering and/or the mechanical milling is performed in a non-oxidizing atmosphere.

16. The production method according to claim 5 wherein the electric current sintering and/or the mechanical milling is performed in a non-oxidizing atmosphere.

17. The production method according to claim 4 wherein the electric current sintering and/or the mechanical milling is performed in an electric currently conductive die.

18. The production method according to claim 5 wherein the electric current sintering and/or the mechanical milling is performed in an electric currently conductive die.

19. The production method according to claim 6 wherein the electric current sintering and/or the mechanical milling is performed in an electric currently conductive die.

20. The production method according to claim 4 wherein the electric current sintering and/or the mechanical milling is performed under increased pressure.

* * * * *